United States Patent
Wu et al.

(10) Patent No.: US 8,594,008 B2
(45) Date of Patent: Nov. 26, 2013

(54) RELAY COMMUNICATIONS METHODS AND APPARATUS

(75) Inventors: Xinzhou Wu, Monmouth Junction, NJ (US); Junyi Li, Chester, NJ (US)

(73) Assignee: QUALCOMM Incorporated, San Diego, CA (US)

(*) Notice: Subject to any disclaimer, the term of this patent is extended or adjusted under 35 U.S.C. 154(b) by 965 days.

(21) Appl. No.: 12/272,993

(22) Filed: Nov. 18, 2008

(65) Prior Publication Data

US 2010/0124185 A1 May 20, 2010

(51) Int. Cl.
*H04B 7/14* (2006.01)

(52) U.S. Cl.
USPC .......................................................... 370/315

(58) Field of Classification Search
None
See application file for complete search history.

(56) References Cited

U.S. PATENT DOCUMENTS

| | | | |
|---|---|---|---|
| 6,657,982 B1 * | 12/2003 | Fong et al. | 370/336 |
| 8,190,083 B2 | 5/2012 | Wu et al. | |
| 2005/0070287 A1 | 3/2005 | Cave et al. | |
| 2005/0122931 A1 * | 6/2005 | Kado | 370/328 |
| 2008/0108305 A1 * | 5/2008 | Lin et al. | 455/11.1 |
| 2008/0240054 A1 * | 10/2008 | Sandhu et al. | 370/338 |
| 2009/0088164 A1 * | 4/2009 | Shen et al. | 455/436 |
| 2010/0067427 A1 * | 3/2010 | Choudhury | 370/315 |

FOREIGN PATENT DOCUMENTS

| | | |
|---|---|---|
| CN | 101064911 A | 10/2007 |
| EP | 1890433 | 2/2008 |
| GB | 2281177 | 2/1995 |
| JP | 7030949 A | 1/1995 |
| JP | 9238100 A | 9/1997 |
| JP | 2001285186 A | 10/2001 |
| JP | 2005026816 A | 1/2005 |
| JP | 2005142676 A | 6/2005 |
| JP | 2005167877 A | 6/2005 |
| JP | 2007335913 A | 12/2007 |
| JP | 2008048414 A | 2/2008 |
| JP | 2010503259 A | 1/2010 |
| JP | 2012509030 | 4/2012 |
| TW | 200818942 A | 4/2008 |
| WO | WO0021324 | 4/2000 |

OTHER PUBLICATIONS

Debalina Ghosh, et al., "Admission Control and Interference-Aware Scheduling in Multi-hop WiMAX Networks," IEEE Internatonal CoNference , 2007, 1-9.

(Continued)

*Primary Examiner* — Gregory Sefcheck
*Assistant Examiner* — Steve Young
(74) *Attorney, Agent, or Firm* — Joseph B. Agusta

(57) ABSTRACT

Methods and apparatus relating to interference mitigation in a wireless communications system including multi-sector base stations and relay stations are described. Different types of transmission slots are used, e.g., base station-relay station slots, relay station-access terminal slots, and base station-access terminal slots. Relay station to access terminal slots of a first schedule are non-overlapping with relay station to access terminal slots of a second schedule. A deployment pattern associates each particular base station sector and its associated relay station with one particular schedule. At least some different sectors of the same base station intentionally use different schedules. An access terminal determines and uses the schedule corresponding to the base station sector or relay station from which it intends to receive downlink signals. By utilizing multiple slot type allocation schedules and a particular schedule deployment pattern in the system, interference experienced by access terminals in boundary regions can be mitigated.

37 Claims, 12 Drawing Sheets

(56) References Cited

OTHER PUBLICATIONS

Genc V., et al., "Performance analysis of transparent relays in 802.16j MMR networks," Modeling and Optimization in Mobile, AD HOC, and Wireless Networks and Workshops, 2008, 273-281.

International Search Report and Written Opinion—PCT/US2009/064377, International Search Authority—European Patent Office—Aug. 2, 2010.

Taiwan Search Report—TW098139146—TIPO—Jan. 14, 2013.

* cited by examiner

RELAY COMMUNICATIONS METHODS AND APPARATUS

FIELD

Various embodiments relate to wireless communications, and more particularly, to methods and apparatus for using relay stations.

BACKGROUND

In a cellular network with relay stations, such as, e.g., a cellular network implementing 802.16J, a popular implementation is to structure time division multiplexing between different types of traffic. For example, the downlink slots are divided into three types: base station to relay station, relay station to mobile station, and base station to mobile station, and a single logical sequence of downlink slots is followed throughout the cells of the network.

This approach of using a common slot allocation method throughout the system, is problematic from an interference perspective, particularly in boundary areas. For example, when two neighboring cells are transmitting data concurrently from their relay stations to mobile stations, mobile stations in cell boundary regions can be expected to suffer from inter-cell interference and may suffer from a bad signal to interference noise ratio (SINR).

Based on the above discussion, there is a need for new methods and apparatus to mitigate interference in wireless communications systems which use relay stations.

SUMMARY

Various embodiments are directed to methods and apparatus useful for mitigating interference in a wireless communications system including multi-sector base stations and relay stations. In some embodiments, the exemplary wireless communications system uses a plurality of different types of transmission slots including base station-relay station slots, relay station-access terminal slots, and base station-access terminal slots. The exemplary wireless communications system further implements a plurality of different slot type allocation sequences in the system, e.g., two different slot type allocation sequences. The different slot type allocation sequences may also be referred to as schedules. In some embodiments, two different slot type sequences are different in that the relay station to access terminal slots of the first sequence are non-overlapping with the relay station to access terminal slots of the second sequence. A deployment pattern is implemented in the system associating each particular base station sector and its associated relay station with one of the different slot type sequences. For at least some multi-sector base stations in the system, different sectors intentionally use different slot type allocation sequences. An access terminal in the system determines the slot type allocation sequence corresponding to the base station sector or relay station from which it intends to receive downlink signals and uses the determined slot type sequence when communicating with that particular base station sector or relay station.

By utilizing multiple slot type allocation sequences and implementing an advantageous deployment structure in the system, interference experienced by access terminals in boundary regions can be mitigated.

An exemplary method of operating a sectorized communications device, e.g., a sectorized base station, in accordance with some embodiments, comprises: transmitting to a first relay station from a first sector of said communications device during a first time interval; and transmitting to a second relay station from a second sector of said communications device during a second time interval, said first and second time intervals being non-overlapping time intervals. A sectorized communications device, in accordance with some embodiments, comprises at least one processor configured to: transmit to a first relay station from a first sector of said communications device during a first time interval; and transmit to a second relay station from a second sector of said communications device during a second time interval, said first and second time intervals being non-overlapping time intervals. The exemplary sectorized communications device further includes memory coupled to said at least one processor.

An exemplary method of operating an access terminal, in accordance with some embodiments includes: communicating with a first access point according to a first schedule, said first schedule including access point-access terminal communications time slots; performing a handoff to a second access point synchronized with said first access point; and communicating with the second access point according to a second schedule, said second schedule including access point-access terminal communications time slots, access point-access terminal communications time slots in said first schedule not overlapping access point-access terminal communications time slots in said second schedule. In some such embodiments, access points are relay stations, and the access point-access terminal time slots are relay station-access terminal time slots.

An exemplary access terminal, in some embodiments, comprises: at least one processor configured to: communicate with a first access point according to a first schedule, said first schedule including access point-access terminal communications time slots; perform a handoff to a second access point synchronized with said first access point; and communicate with the second access point according to a second schedule, said second schedule including access point-access terminal communications time slots, access point-access terminal time slots in said first schedule not overlapping access point-access terminal time slots in said second schedule. The exemplary access terminal further comprises memory coupled to said at least one processor.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

DETAILED DESCRIPTION

Figure 1:
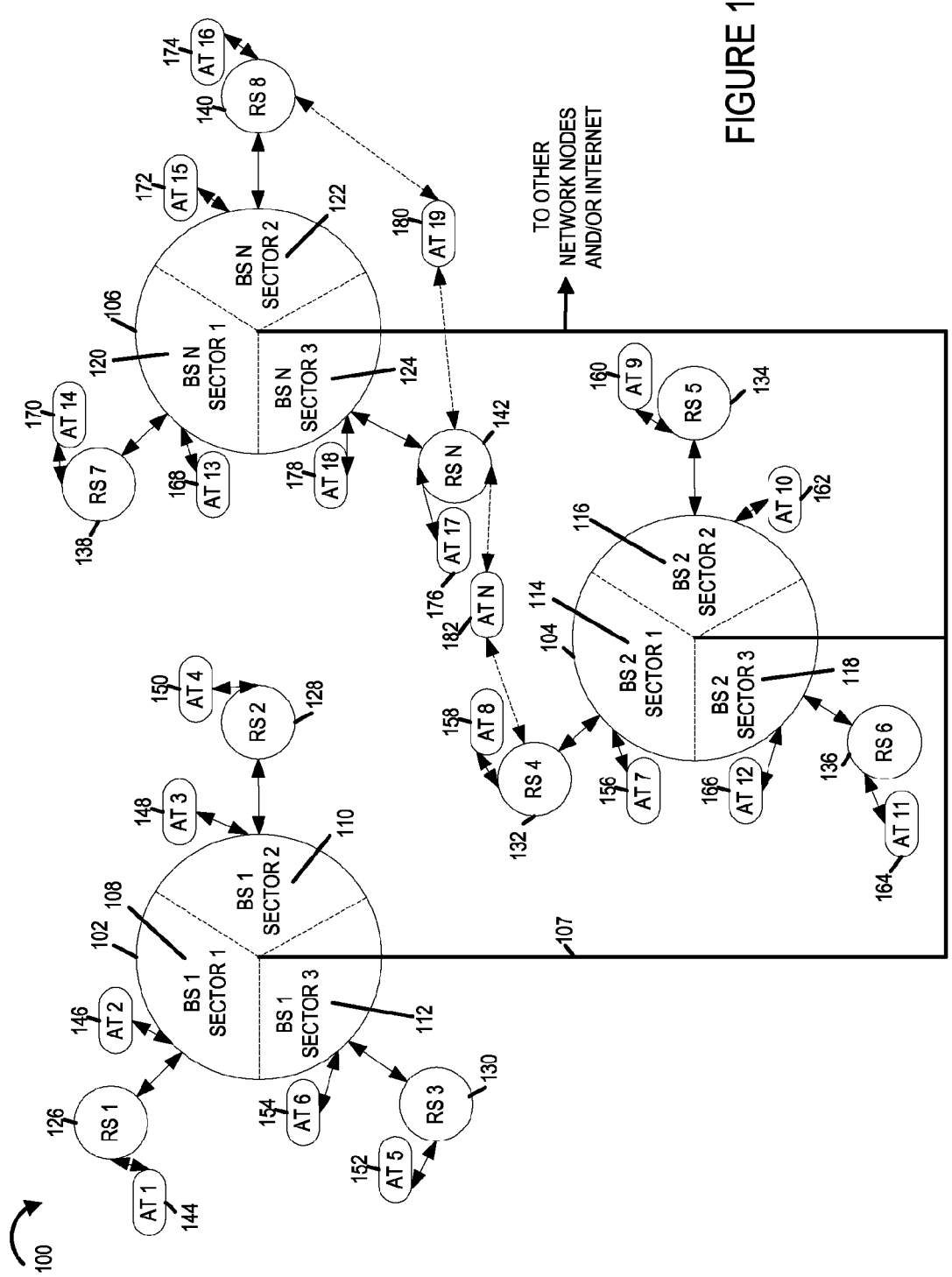
FIG. 1 is a drawing of an exemplary wireless communications system including multi-sector base stations, relay stations and access terminals in accordance with an exemplary embodiment.

FIG. 1 is a drawing of an exemplary wireless communications system 100 in accordance with an exemplary embodiment. Exemplary wireless communication system 100 includes a plurality of multi-sector base stations (base station 1 102, base station 2 104, ... base station N 106). The exemplary base stations (102, 104, ... 106) are coupled together and to other network nodes and/or the Internet via backhaul network 107.

Exemplary communications system 100 also includes a plurality of relay stations (RS 1 126, RS2 128, RS 3 130, RS 4 132, RS 5 134, RS 6 136, RS 7 138, RS 8 140, ..., RS N 142), which extend the coverage regions of the base stations. In this example, the relay stations have corresponding base stations sectors. In particular the relay stations (RS 1 126, RS2 128, RS 3 130, RS 4 132, RS 5 134, RS 6 136, RS 7 138, RS 8 140, ..., RS N 142) correspond to base station-sectors (base station 1 sector 1 108, base station 1 sector 2 110, base station 1 sector 3 112, base station 2 sector 1 114, base station 2 sector 2 116, base station 2 sector 3 118, base station N sector 1 120, base station N sector 2 122, base station N sector 3 124), respectively.

Exemplary communications network 100 also includes a plurality access terminals (AT 1 144, AT 2 146, AT 3 148, AT 4 150, AT 5 152, AT 6 154, AT 7 156, AT 8 158, AT 9 160, AT 10 162, AT 11 164, AT 12 166, AT 13 168, AT 14 170, AT 15 172, AT 16 174, AT 17 176, AT 18 178, AT 19 180, ..., AT N 182), e.g., wireless terminals. At least some of the access terminals are mobile wireless terminals which may move throughout the communications system 100 and have a different point of attachment at a different time depending upon its current location.

In this example, access terminals (AT 1 144, AT 2 146, AT 3 148, AT 4 150, AT 5 152, AT 6 154, AT 7 156, AT 8 158, AT 9 160, AT 10 162, AT 11 164, AT 12 166, AT 13 168, AT 14 170, AT 15 172, AT 16 174, AT 17 176) have current wireless connections with (RS 1 126, BS 1 sector 1 108, BS 1 sector 2 110, RS 2 128, RS 3 130, BS 1 sector 3 112, BS 2 sector 1 114, RS 4 132, RS 5 134, BS 2 sector 2 116, RS 6 136, BS 2 sector 3 118, BS N sector 1 120, RS 7 138, BS N sector 2 122, RS 8 140, RS N 142, BS N sector 3 124), respectively. Access terminal 19 180 is in the process of a handoff between RS 8 140 and RS N 142 which is a handoff between adjacent relay stations corresponding to the same base station. Access terminal N 182 is in the process of a handoff between RS N 142 and RS 4 132, which is a handoff between adjacent relay stations corresponding to different base stations.

Figure 2:
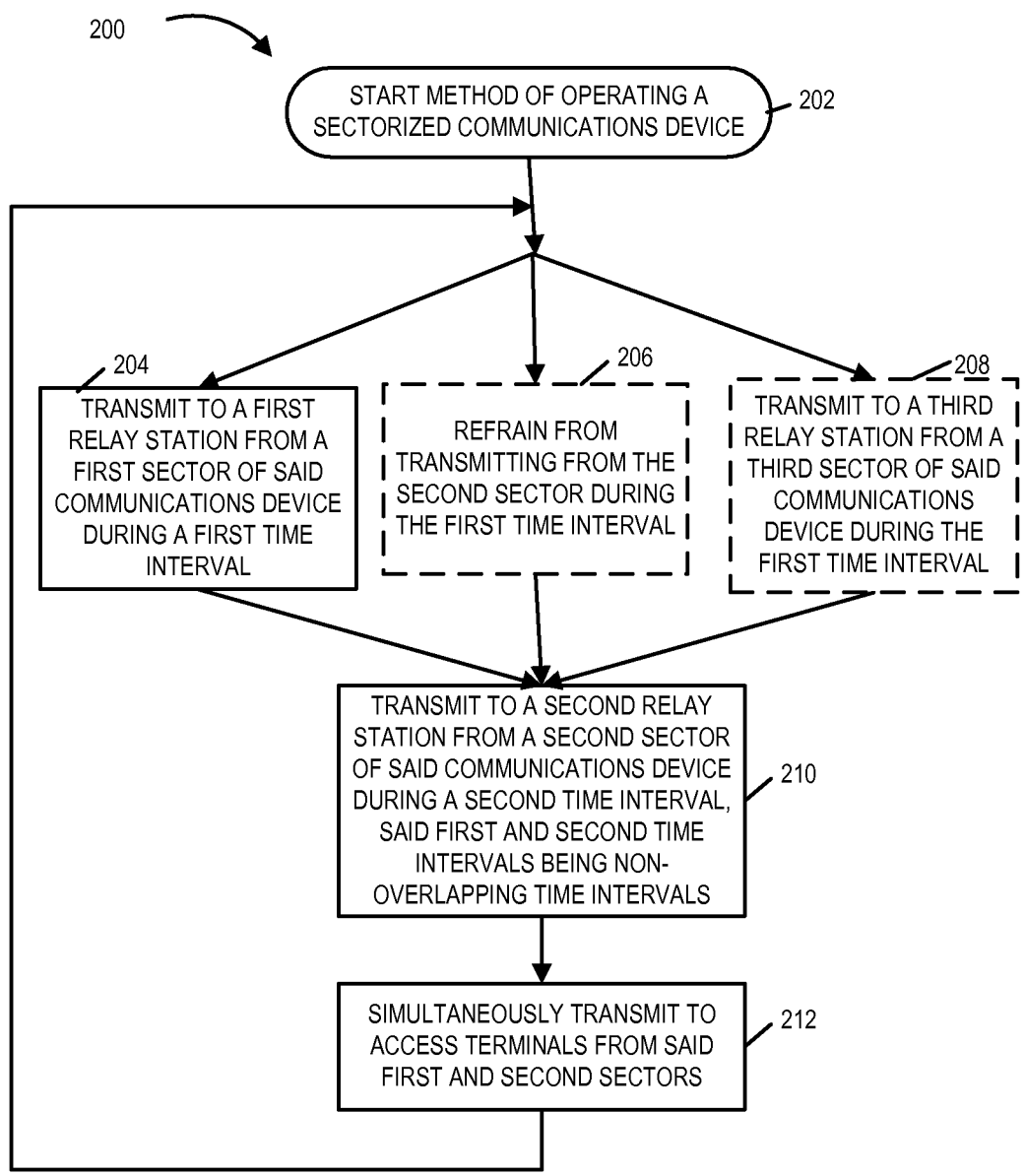
FIG. 2 is a flowchart of an exemplary method of operating a sectorized communications device in a wireless communications system.

FIG. 2 is a flowchart 200 of an exemplary method of operating a sectorized communications device in accordance with an exemplary embodiment. The sectorized communications device is a communications device which includes multiple sectors, e.g., at least a first sector and a second sector. In some embodiments, the sectorized communications device includes three sectors. The sectorized communications device is, e.g., a sectorized base station. For example, the sectorized communications device is one of the sectorized base stations of system 100 of FIG. 1. Operation starts in step 202, where the sectorized communications device is powered on and initialized and proceeds to step 204. Steps 206 and 208 are optional steps, of which one or more are included in some embodiments. In some such embodiments, operation also proceeds from step 202 to one or more of optional steps 206 and 208.

In step 204, the communications device transmits to a first relay station from a first sector of said communications device during a first time interval. Returning to step 206, in step 206, the communications device is controlled to refrain from transmitting from the second sector during the first time interval. Returning to step 208, in step 208, the communications device transmits to a third relay station from a third sector of the communications device during the first time interval. Operation proceeds from step 204 to step 210. In some embodiments, operation also proceeds from one or more of steps 206 and 208 to step 210.

In step 210 the communications device transmits to a second relay station from a second sector of said communications device during a second time interval, said first and second time intervals being non-overlapping time intervals. In various embodiments, the first and second time intervals are recurring time intervals. In some embodiments, the first time interval is a time interval during which the second relay station transmits to access terminals. In some embodiments, the first time interval is a time interval during which the first relay station transmits to access terminals.

In various embodiments, the first and second relay stations are relay stations corresponding to said first and second sectors respectively. In some such embodiments, the third relay station corresponds to the third sector.

Operation proceeds from step 210 to step 212. In step 212 the communications device simultaneously transmits to access terminals from said first and second sectors. In some such embodiments, the communications device simultaneously transmits to access terminals from each of its sectors, e.g., from first, second and third sectors. Operation proceeds from step 212 to the input of step 204. In some embodiments, operation also proceeds from step 212 to the input of one or more of steps 206 and 208.

Figure 3:
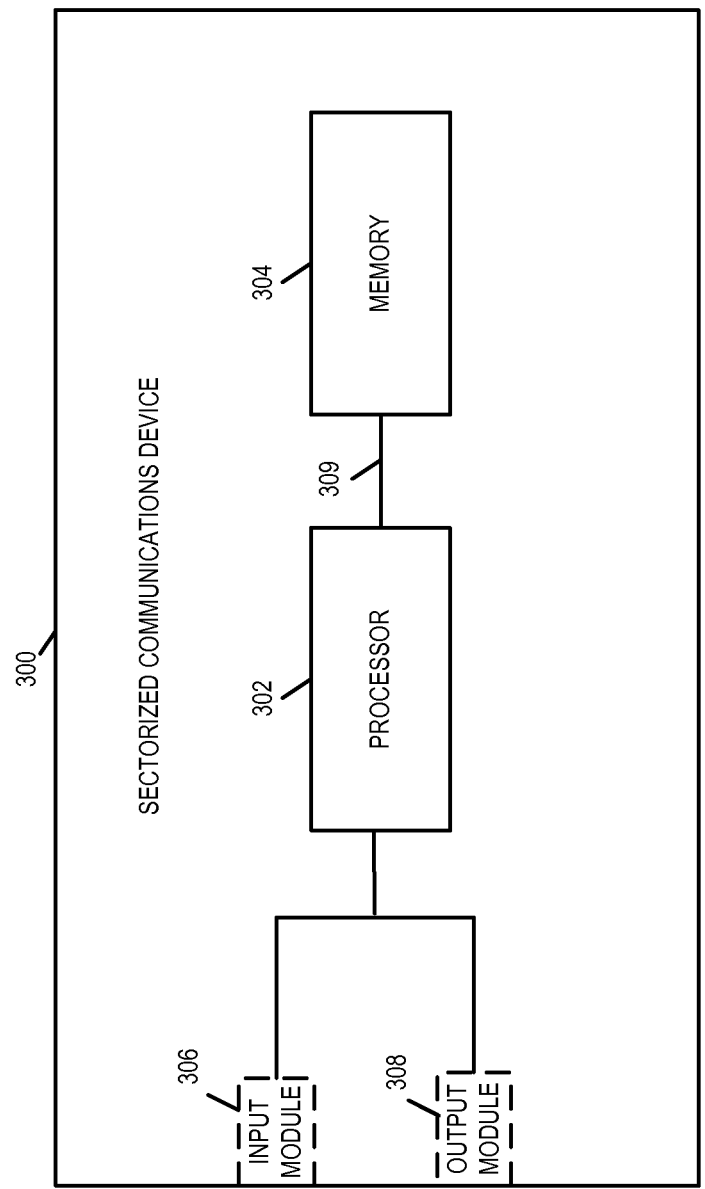
FIG. 3 is a drawing of an exemplary sectorized communications device in accordance with an exemplary embodiment.

FIG. 3 is a drawing of an exemplary sectorized communications device 300, e.g., a sectorized base station, in accordance with an exemplary embodiment. Communications device 300 is, e.g., one of the base stations of system 100 of FIG. 1. Exemplary sectorized communications device 300 implements a method in accordance with flowchart 200 of FIG. 2.

Communications device 300 includes a processor 302 and memory 304 coupled together via a bus 309 over which the various elements (302, 304) may interchange data and information. Communications device 300 further includes an input module 306 and an output module 308 which may be coupled to processor 302 as shown. However, in some embodiments, the input module 306 and output module 308 are located internal to the processor 302. Input module 306 can receive input signals. Input module 306 can, and in some embodiments does, include a wireless receiver and/or a wired or optical input interface for receiving input. Input module 306, in some embodiments, includes individual input sub-modules corresponding to each sector of sectorized communications device 300. Output module 308 may include, and in some embodiments does include, a wireless transmitter and/or a wired or optical output interface for transmitting output. Output module 308, in some embodiments, includes individual output sub-modules corresponding to each sector of sectorized communications device 300.

Processor 302 is configured to: transmit to a first relay station from a first sector of said communications device during a first time interval; and transmit to a second relay station from a second sector of said communications device during a second time interval, said first and second time intervals being non-overlapping time intervals. In various embodiments, the first and second time intervals are recurring time intervals. In some embodiments, said second time interval is a time interval during which said first relay station transmits to access terminals. In some embodiments, said first time interval is a time interval during which said second relay station transmits to access terminals. In some embodiments said first and second relay stations are relay stations corresponding to said first and second sectors, respectively.

Processor 302, in some embodiments, is further configured to: simultaneously transmit to access terminals from said first and second sectors. In some embodiments, processor 302 is configured to refrain from transmitting from the second sector during said first time interval.

In some embodiments, the sectorized communications device, of which processor 302 is a part of, includes three sectors; and processor 302 is further configured to transmit to a third relay station from a third sector of said communications device during first time interval.

Figure 4:
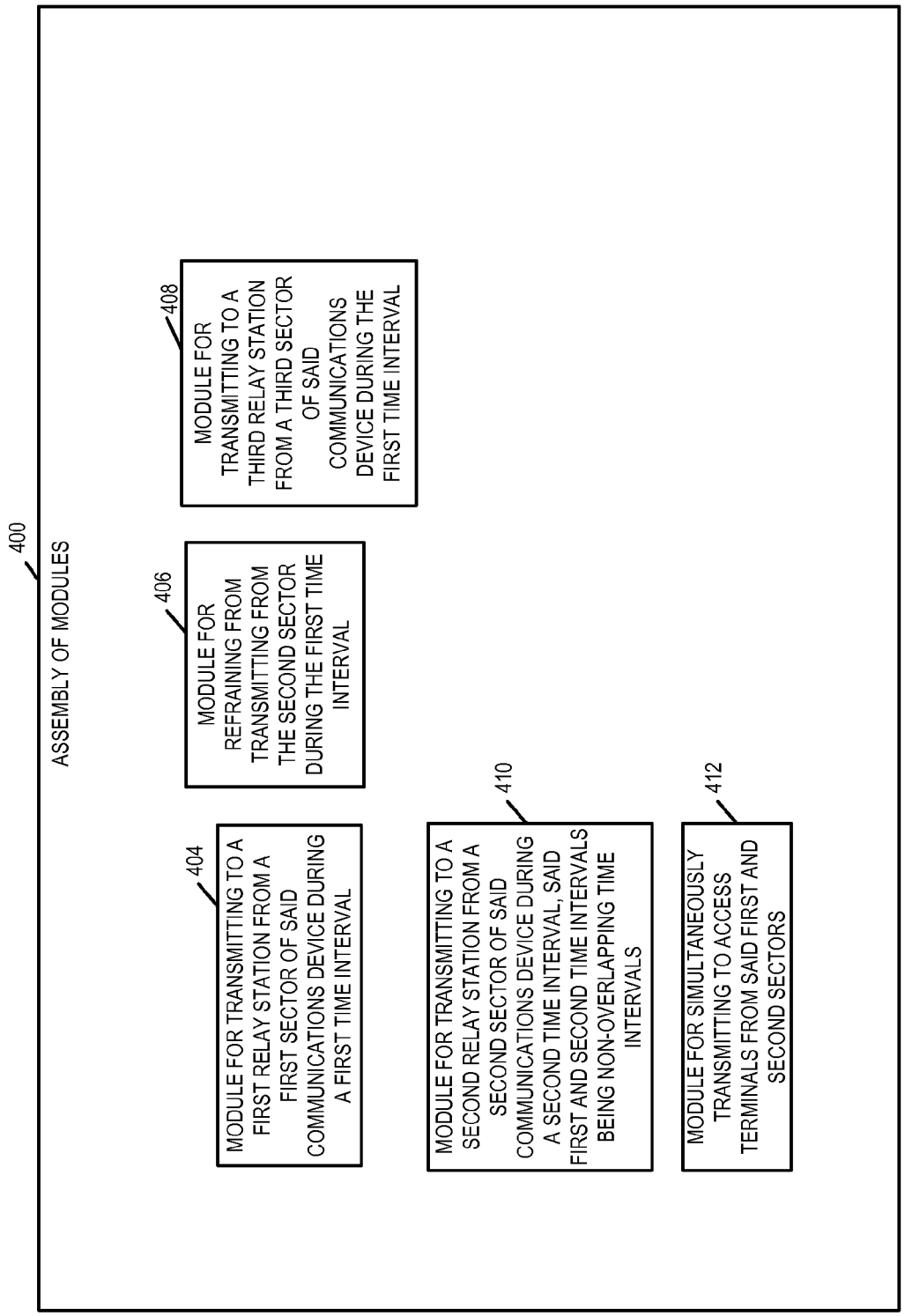
FIG. 4 is an assembly of modules which can, and in some embodiments are, used in the sectorized communications device illustrated in FIG. 3.

FIG. 4 is an assembly of modules 400 which can, and in some embodiments are, used in the sectorized communications device 300 illustrated in FIG. 3. The modules in the assembly 400 can be implemented in hardware within the processor 302 of FIG. 3, e.g., as individual circuits. Alternatively, the modules may be implemented in software and stored in the memory 304 of the communications device 300 shown in FIG. 3. While shown in the FIG. 3 embodiment as a single processor, e.g., computer, it should be appreciated that the processor 302 may be implemented as one or more processors, e.g., computers. When implemented in software the modules include code, which when executed by the processor, configure the processor, e.g., computer, 302 to implement the function corresponding to the module. In embodiments where the assembly of modules 400 is stored in the memory 304, the memory 304 is a computer program product comprising a computer readable medium comprising code, e.g., individual code for each module, for causing at least one computer, e.g., processor 302, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 4 control and/or configure the communications device 300 or elements therein such as the processor 302, to perform the functions of the corresponding steps illustrated in the method flowchart 200 of FIG. 2.

As illustrated in FIG. 4, the assembly of modules 400 includes: a module 404 for transmitting to a first relay station from a first sector of a communications device during a first time interval 404, a module 406 for refraining from transmitting from the second sector during the first time interval, a module 408 for transmitting to a third relay station from a third sector of said communications device during the first time interval, a module 410 for transmitting to a second relay station from a second sector of said communications device during a second time interval, said first and second time intervals being non-overlapping time intervals, and a module 412 for simultaneously transmitting to access terminals from said first and second sectors.

In some embodiments, the first and second time intervals are recurring time intervals. In various embodiments, the first time interval is a time interval during which the second relay station transmits to access terminals. In some embodiments, the second time interval is a time interval during which the first relay station transmits to access terminals. The first and second relay stations are, in some embodiments, relay stations corresponding to the first and second sectors, respectively.

Figure 5:
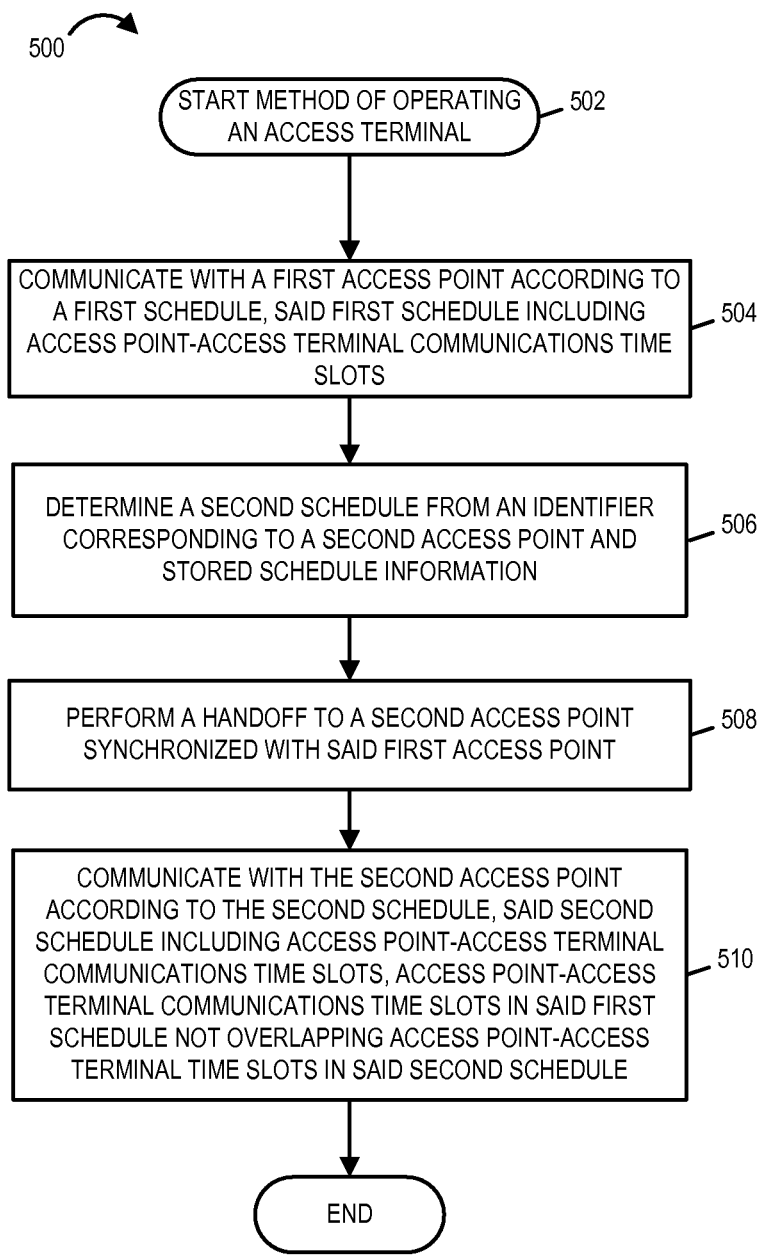
FIG. 5 is a flowchart of an exemplary method of operating an access terminal in a wireless communications system.

FIG. 5 is a flowchart 500 of an exemplary method of operating an access terminal, e.g., a mobile node of mobile terminal, in accordance with an exemplary embodiment. The access terminal is, e.g., part of a wireless communications system including sectorized base stations and relay stations. For example, the access terminal is one of the access terminals of system 100 of FIG. 1. Operation of the exemplary method starts in step 502 where the access terminal is powered on and initialized and proceeds to step 504.

In step 504 the access terminal communicates with a first access point according to a first schedule, said first schedule including access point-access terminal communications time slots. Operation proceeds from step 504 to step 506. In step 506 the access terminal determines a second schedule from an identifier corresponding to a second access point and stored schedule information. In some embodiments, the determination is performed based on a combination of a device identifier corresponding to the second access point and a sector identifier. In some embodiments, the access terminal determines a device identifier and/or a sector identifier from a received detected broadcast signal. In some such embodiments, the received broadcast signal is a beacon signal. Operation proceeds from step 506 to step 508. In step 508 the access terminal performs a handoff to a second access point synchronized with the first access point. In some embodiments, the first and second access points are adjacent relay stations. Then, in step 510 the access terminal communicates with the second access point according to the second schedule, said second schedule including access point-access terminal communications time slots, access point-access terminal time slots in said first schedule not overlapping access point-access terminal time slots in said second schedule.

In some embodiments, the access point-access terminal time slots in the second schedule are relay station-access terminal time slots, and the second schedule further includes base station-relay station time slots. In some such embodiments, the second schedule further includes base station-access terminal time slots. In some such embodiments, the access point-access terminal time slots in the first schedule are relay station-access terminal time slots, and the first schedule further includes base station-relay station time slots and base station-access terminal time slots.

Figure 6:
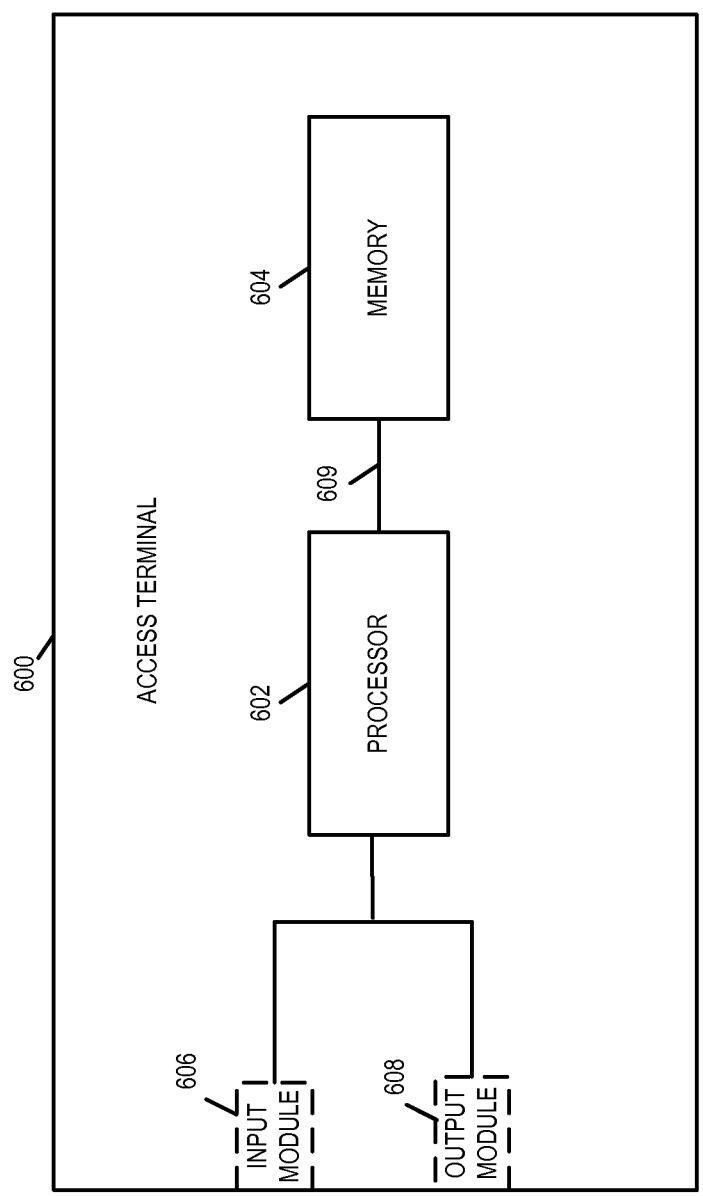
FIG. 6 is a drawing of an exemplary access terminal in accordance with an exemplary embodiment.

FIG. 6 is a drawing of an exemplary access terminal 600, e.g., a mobile wireless terminal, in accordance with an exemplary embodiment. Access terminal 600 is, e.g., one of the access terminals of system 100 of FIG. 1. Exemplary access terminal 600 implements a method in accordance with flowchart 500 of FIG. 5.

Access terminal 600 includes a processor 602 and memory 604 coupled together via a bus 609 over which the various elements (602, 604) may interchange data and information. Access terminal 600 further includes an input module 606 and an output module 608 which may be coupled to processor 602 as shown. However, in some embodiments, the input module 606 and output module 608 are located internal to the processor 602. Input module 606 can receive input signals, while output module 608 can transmit output signals. Input module 606 can, and in some embodiments does, include a wireless receiver and/or a wired or optical input interface for receiving input. Output module 608 may include, and in some embodiments does include, a wireless transmitter and/or a wired or optical output interface for transmitting output.

Processor 602 is configured to: communicate with a first access point according to a first schedule, said first schedule including access point-access terminal communications time slots; perform a handoff to a second access point synchronized with said first access point; and communicate with the second access point according to a second schedule, said second schedule including access point-access terminal communications time slots, access point-access terminal time slots in said first schedule not overlapping access point-access terminal time slots in said second schedule. In some embodiments, said first and second access points are adjacent relay stations. In some such embodiments, the access point-access terminal time slots are relay station-access terminal time slots.

In some embodiments, processor 602 is further configured to: determine the second schedule from an identifier corresponding to the second access point and stored schedule information. In various embodiments, the access point-access terminal time slots in said second schedule are relay station-access terminal time slots, and the second schedule further includes base station-relay station time slots. In some such embodiments, said second schedule further includes base station-access terminal time slots. In some such embodiments, the first schedule includes relay station-access terminal time slots, base station-relay station time slots, and base station-access terminal time slots.

Figure 7:
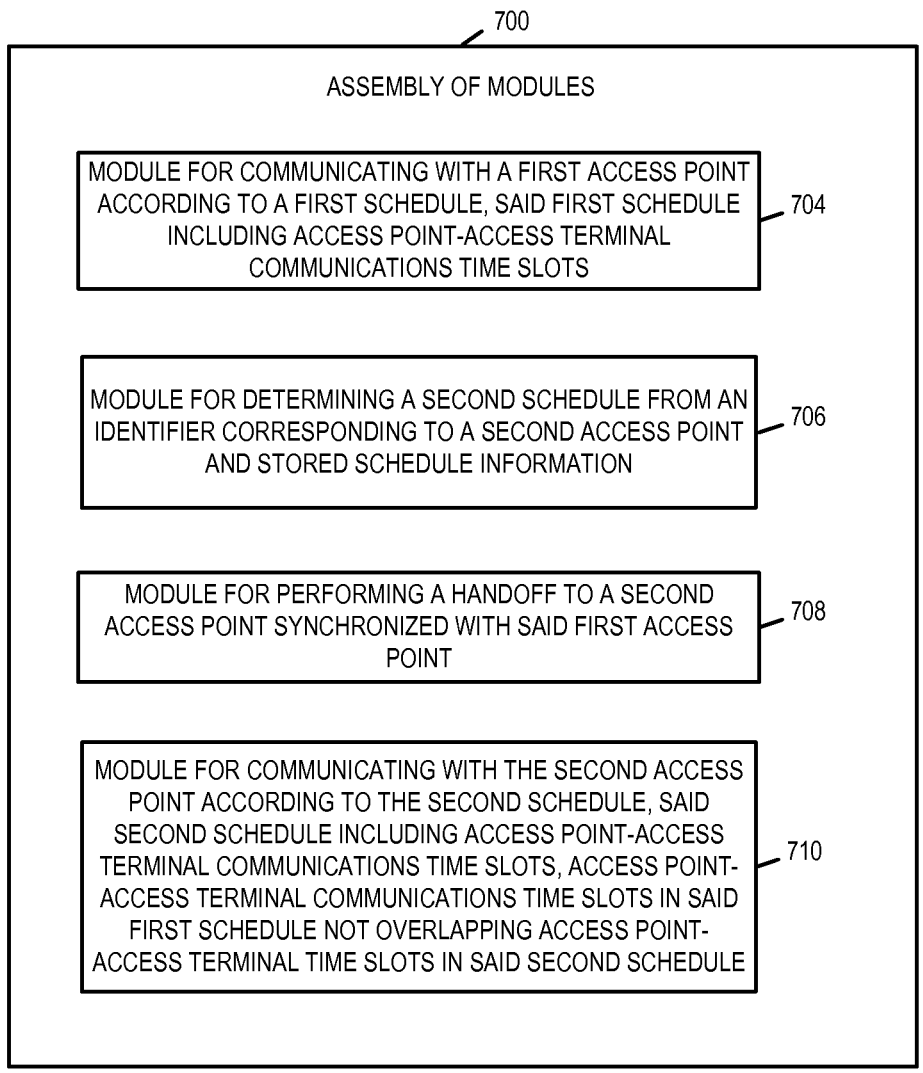
FIG. 7 is an assembly of modules which can, and in some embodiments are, used in the access terminal illustrated in FIG. 6.

FIG. 7 is an assembly of modules 700 which can, and in some embodiments are, used in access terminal 600 illustrated in FIG. 6. The modules in the assembly 600 can be implemented in hardware within the processor 602 of FIG. 6, e.g., as individual circuits. Alternatively, the modules may be implemented in software and stored in the memory 604 of the access terminal 600 shown in FIG. 6. While shown in the FIG. 6 embodiment as a single processor, e.g., computer, it should be appreciated that the processor 602 may be implemented as one or more processors, e.g., computers. When implemented in software the modules include code, which when executed by the processor, configure the processor, e.g., computer, 602 to implement the function corresponding to the module. In embodiments where the assembly of modules 700 is stored in the memory 604, the memory 604 is a computer program product comprising a computer readable medium comprising code, e.g., individual code for each module, for causing at least one computer, e.g., processor 602, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 7 control and/or configure the communications device 600 or elements therein such as the processor 602, to perform the functions of the corresponding steps illustrated in the method flowchart 500 of FIG. 5.

As illustrated in FIG. 7, the assembly of modules 700 includes: a module 704 for communicating with a first access point according to a first schedule, said first schedule including access point-access terminal time slots, a module 706 for determining a second schedule from an identifier corresponding to a second access point and stored schedule information, a module 708 for performing a handoff to a second access point synchronized with said first access point, and a module 710 for communicating with the second access point according to the second schedule, said second schedule including access point-access terminal communications time slots, access point-access terminal time slots in said first schedule not overlapping access point-access terminal time slots in said second schedule.

In some embodiments, the first and second access points are adjacent relay stations. In various embodiments, the access point-access terminal time slots in said second schedule are relay station-access terminal time slots, and said second schedule further includes base station-relay station time slots. In some such embodiments, the second schedule further includes base station-access terminal time slots. In some such embodiments, the first schedule includes relay station-access terminal time slots, base station-relay station time slots, and base station-access terminal time slots.

In some embodiments, module 706 performs its determination based on a combination of a device identifier corresponding to the second access point and a sector identifier. In some embodiments, the access terminal determines a device identifier and/or a sector identifier from a received detected broadcast signal. In some such embodiments, the received broadcast signal is a beacon signal.

Figure 8:
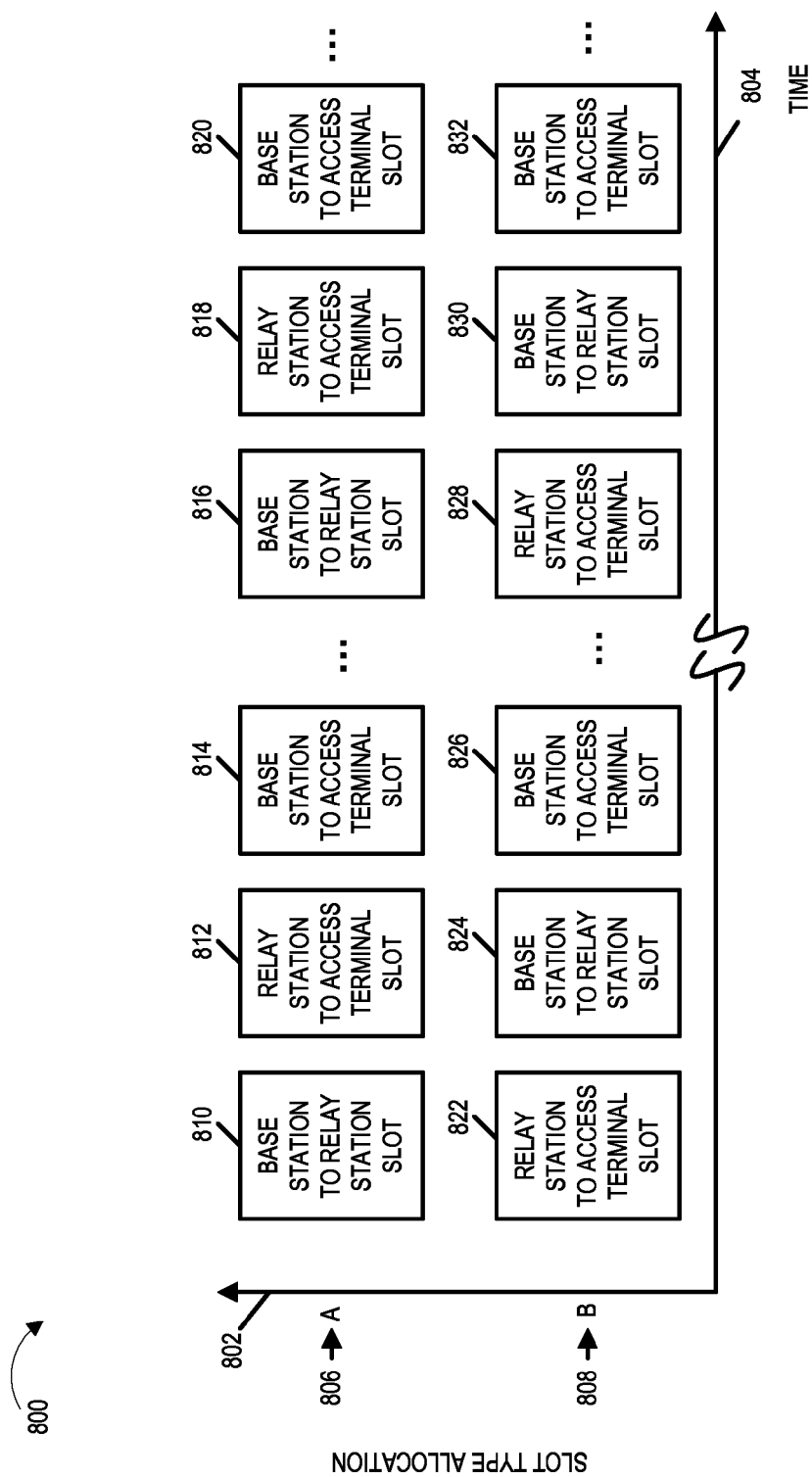
FIG. 8 is a drawing illustrating different exemplary slot type allocation schedules in accordance with an exemplary embodiment.

FIG. 8 is a drawing 800 illustrating different exemplary slot type allocation scheduling in accordance with an exemplary embodiment. Drawing 800 includes a vertical axis 802 representing slot type allocation and a horizontal axis 804 representing time. Slot type allocation A 806 is illustrated by the pattern of: a base station to relay station slot 810, a relay station to access terminal slot 812, and a base station to access terminal slot 814. The scheduling pattern repeats as illustrated by the subsequent sequence of base station to relay station slot 816, relay station to access terminal slot 818 and base station to access terminal slot 820. Slot type allocation B 808 is illustrated by the pattern of: a relay station to access terminal slot 822, a base station to relay station slot 824, and a base station to access terminal slot 826. The scheduling pattern repeats as illustrated by the subsequent sequence of relay station to access terminal slot 828, base station to relay station slot 830 and base station to access terminal slot 832.

It should be observed that a relay station to access terminal slot corresponding to slot type A allocation is intentionally non-overlapping with a relay station to access terminal slot corresponding to slot to B allocation. This feature of non-overlapping relay station to access terminal time slots corresponding to different scheduling types is beneficial for interference mitigation purposes.

An example, will be described to illustrate the benefit of the approach of using different types of downlink slot type allocations to mitigate interference. Assume that a base station signal will be received at an access terminal at 10 dBs above thermal and that a relay station signal can be received at the access terminal at 15 dBs above thermal. If every cell is using the same slot structure, the access terminal on the cell boundary will see SINR at 0 dBs due to interference from a relay station in the neighboring cell. On the other hand, if different slot types are used in two neighboring cells, the access terminal on the boundary cell will see at worst an SINR of 5 dB since the interference is from the neighboring BS.

In the FIG. 8 illustration, it may also be observed that base station to access terminal slots of slot type allocation A overlap base station to access terminal slots of slot type allocation B. If access terminals close to a base station are serviced by the base station rather than by a relay station, the power levels of the base station to access terminal signals can be controlled such as to be low enough such that inter-cell interference is not an issue with regard to the overlapping base station to access terminal slots.

Figure 9:
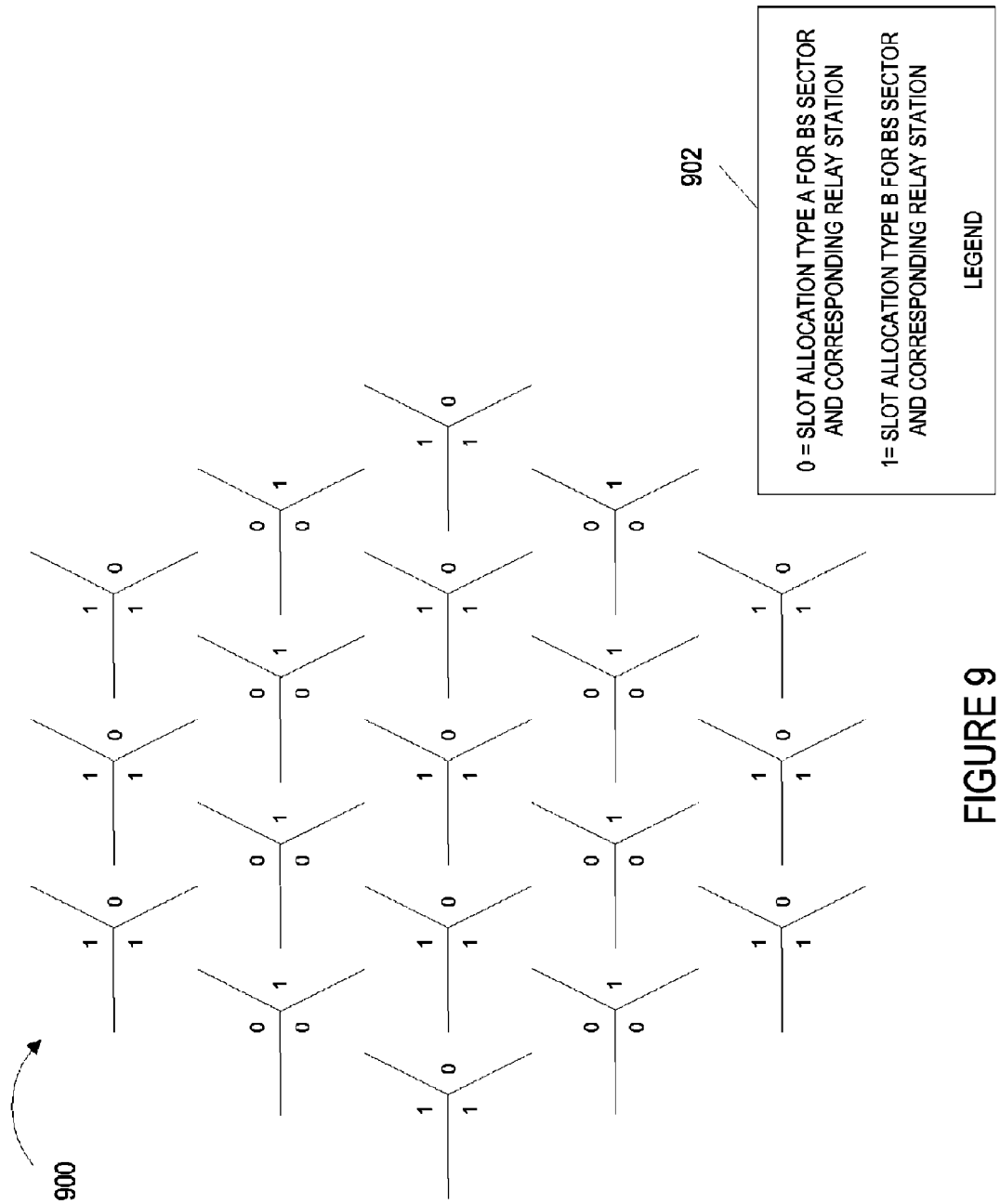
FIG. 9 illustrates an exemplary slot type allocation pattern across a multi-cell communications system in accordance with an exemplary embodiment.

FIG. 9 includes drawing 900 illustrating exemplary slot type allocation across a multi-cell communications system in accordance with an exemplary embodiment. In this example, there are two types of slot allocations used in the exemplary sectorized deployment. The sectorized deployment may, and sometimes does, include both sectorized base stations and relay stations. Legend 900 indicates that: (i) "0" in drawing 900 represents slot type allocation A for a base station sector and its corresponding relay station; and (ii) "1" in drawing 900 represents slot type allocation B for a base station sector and its corresponding relay station. Slot allocation type A is, e.g., the slot type allocation A 806 illustrated in FIG. 8, and slot type allocation B is, e.g., the slot type allocation B 808 illustrated in FIG. 8.

Figure 10:
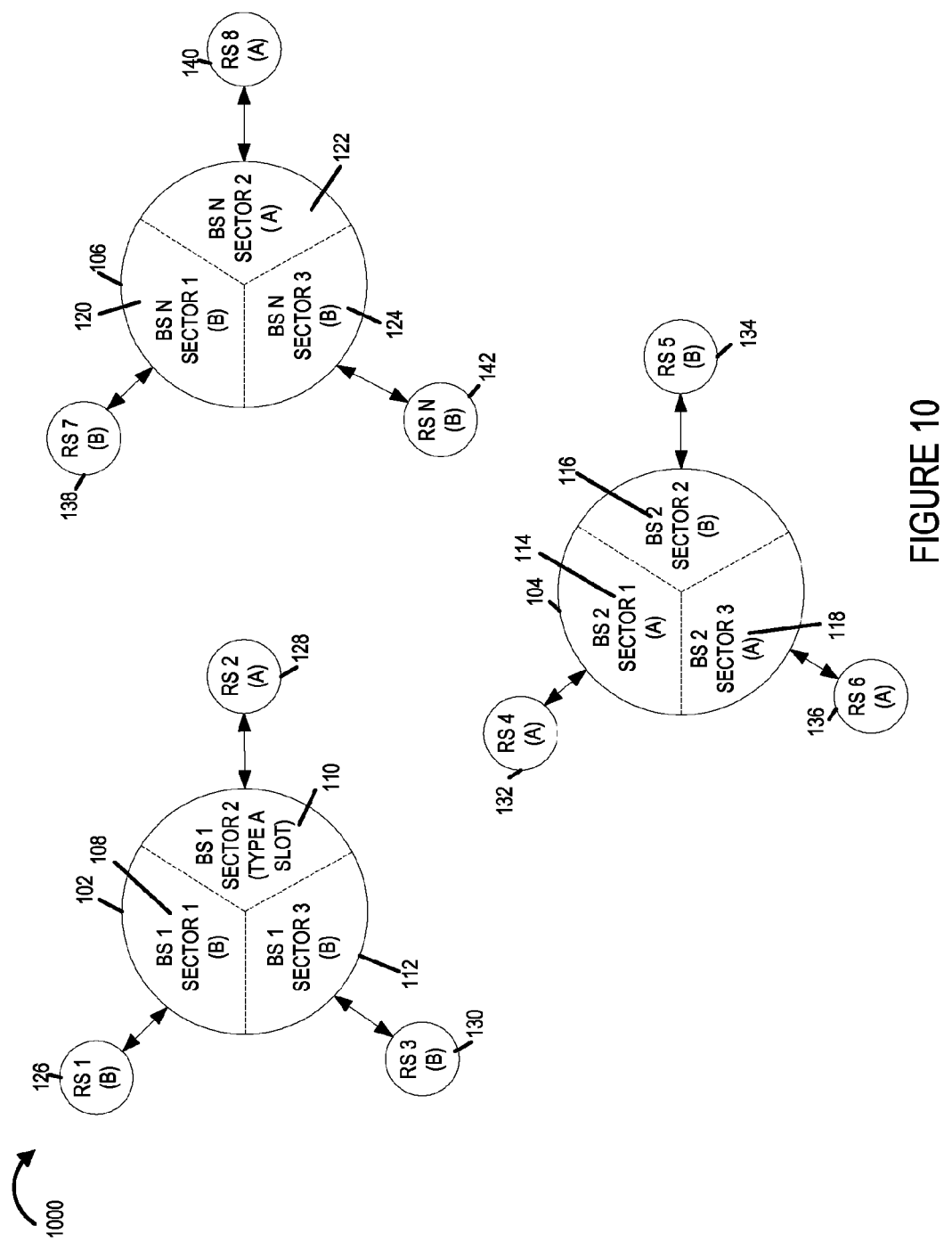
FIG. 10 is a drawing illustrating an exemplary embodiment, where the slot type allocations described in FIG. 8 and the deployment pattern of FIG. 9 are used in the exemplary system of FIG. 1.

FIG. 10 is a drawing 1000 illustrating an exemplary embodiment, where the slot type allocations described in FIG. 8 and the deployment pattern of FIG. 9 are used in the exemplary system 100 of FIG. 1. Base station 1 sector 1 102 and its corresponding relay station, RS 1 126, use slot allocation type B. Base station 1 sector 2 110 and its corresponding relay station, RS 2 128, use slot allocation type A. Base station 1 sector 3 112 and its corresponding relay station, RS 3 130, use slot allocation type B. Base station 2 sector 1 114 and its corresponding relay station, RS 4 132, use slot allocation type A. Base station 2 sector 2 116 and its corresponding relay station, RS 5 134, use slot allocation type B. Base station 2 sector 3 118 and its corresponding relay station, RS 6 136, use slot allocation type A. Base station N sector 1 120 and its corresponding relay station, RS 7 138, use slot allocation type B. Base station N sector 2 122 and its corresponding relay station, RS 8 140, use slot allocation type A. Base station N sector 3 124 and its corresponding relay station, RS N 142, use slot allocation type B. An access terminal communicating with a base station sector or relay station, e.g., receiving downlink signals from the base station sector or relay station, determines the slot allocation type corresponding to the base station sector or relay station and uses the determined schedule.

Figure 11:
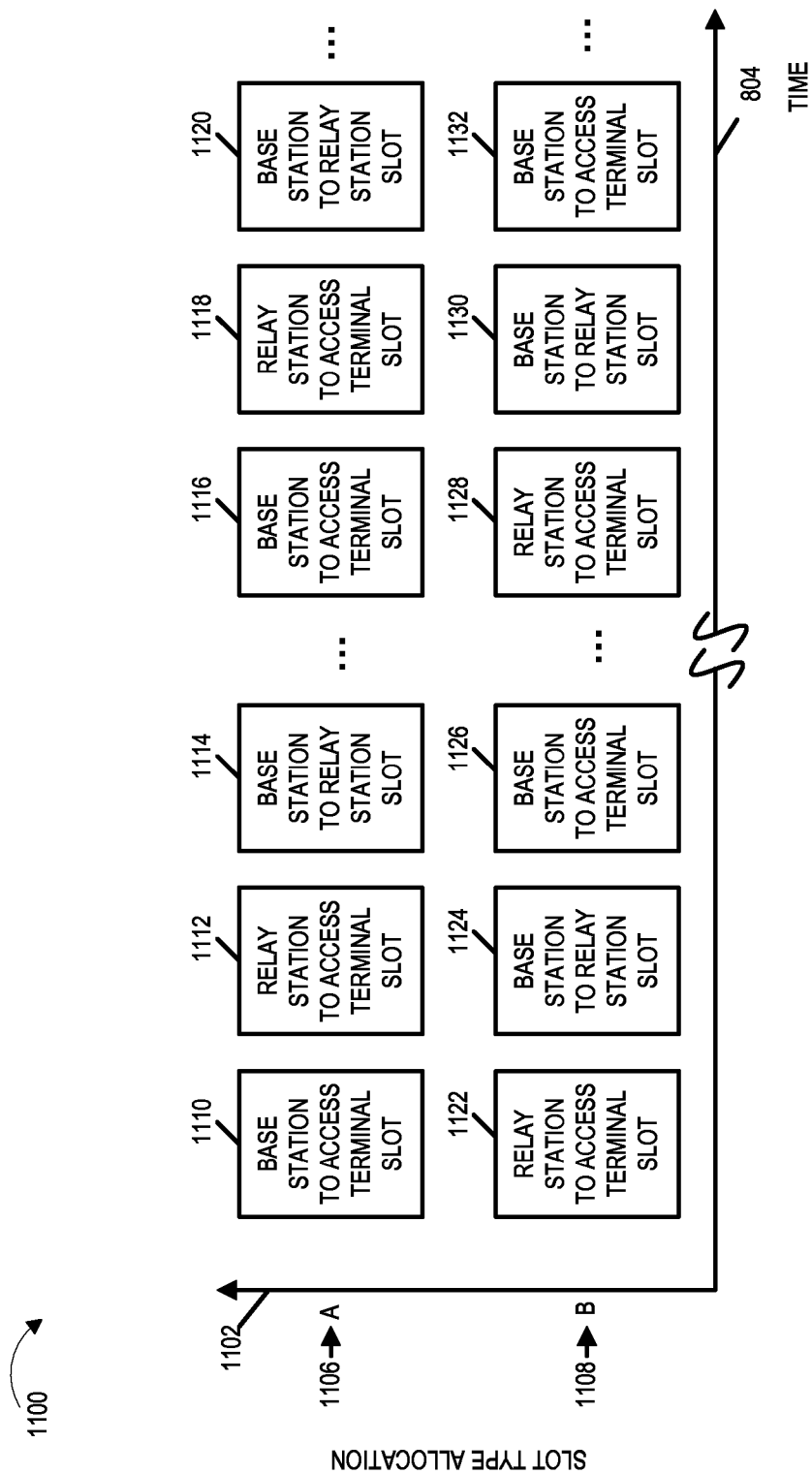
FIG. 11 illustrates different exemplary slot type allocation schedules in accordance with another exemplary embodiment.

FIG. 11 is a drawing 1100 illustrating different exemplary slot type allocation scheduling in accordance with an exemplary embodiment. The different exemplary slot type allocation scheduling of FIG. 11 is, in some embodiments, used as an alternative to the exemplary slot type allocations of FIG. 8. Drawing 1100 includes a vertical axis 1102 representing slot type allocation and a horizontal axis 1104 representing time. Slot type allocation A 1106 is illustrated by the pattern of: a base station to access terminal slot 1110, a relay station to access terminal slot 1112, and a base station to relay station slot 1114. The scheduling pattern repeats as illustrated by the subsequent sequence of base station to access terminal slot 1116, relay station to access terminal slot 1118 and base station to relay station slot 1120. Slot type allocation B 1108 is illustrated by the pattern of: a relay station to access terminal slot 1122, a base station to relay station slot 1124, and a base station to access terminal slot 1126. The scheduling pattern repeats as illustrated by the subsequent sequence of relay station to access terminal slot 1128, base station to relay station slot 1130 and base station to access terminal slot 1132.

It should be observed that a relay station to access terminal slot corresponding to slot type A allocation is intentionally non-overlapping with a relay station to access terminal slot corresponding to slot to B allocation. This feature of non-overlapping relay station to access terminal time slots corresponding to different scheduling types is beneficial for interference mitigation purposes.

Figure 12:
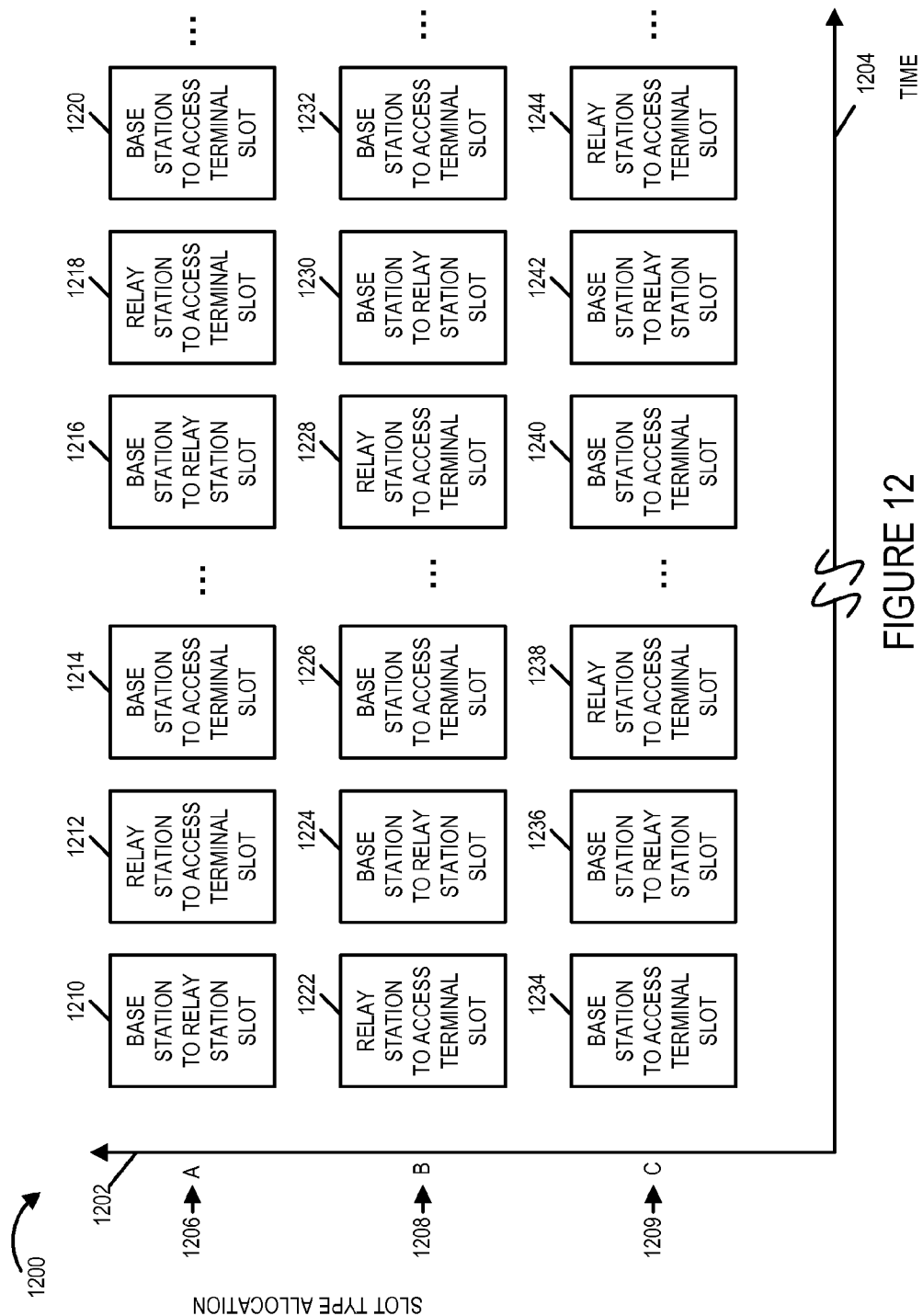
FIG. 12 illustrates different exemplary slot type allocation schedules in accordance with yet another exemplary embodiment.

FIG. 12 is a drawing 1200 illustrating different exemplary slot type allocation scheduling in accordance with an exemplary embodiment. The different exemplary slot type allocation scheduling of FIG. 12 is, in some embodiments, used as an alternative to the exemplary slot type allocations of FIG. 8. Drawing 1200 includes a vertical axis 1202 representing slot type allocation and a horizontal axis 1204 representing time. Slot type allocation A 1206 is illustrated by the pattern of: a base station to relay station slot 1210, a relay station to access terminal slot 1212, and a base station to access terminal slot 1214. The scheduling pattern repeats as illustrated by the subsequent sequence of base station to relay station slot 1216, relay station to access terminal slot 1218 and base station to access terminal slot 1220. Slot type allocation B 1208 is illustrated by the pattern of: a relay station to access terminal slot 1222, a base station to relay station slot 1224, and a base station to access terminal slot 1226. The scheduling pattern repeats as illustrated by the subsequent sequence of relay station to access terminal slot 1228, base station to relay station slot 1230 and base station to access terminal slot 1232. Slot type allocation C 1209 is illustrated by the pattern of: a base station to access terminal slot 1234, a base station to relay station slot 1236, and a relay station to access terminal slot 1238. The scheduling pattern repeats as illustrated by the subsequent sequence of base station to access terminal slot 1240, base station to relay station slot 1242 and relay station to access terminal slot 1244.

It should be observed that a relay station to access terminal slot corresponding to slot type A allocation is intentionally non-overlapping with a relay station to access terminal slot corresponding to slot type B allocation; and a relay station to access terminal slot corresponding to slot type A allocation is intentionally non-overlapping with a relay station to access terminal slot corresponding to slot type C allocation. In addition, a relay station to access terminal slot corresponding to slot type B allocation is intentionally non-overlapping with a relay station to access terminal slot corresponding to slot type C allocation. This feature of non-overlapping relay station to access terminal time slots corresponding to different scheduling types is beneficial for interference mitigation purposes.

In some embodiments, each of the different slot type allocations (A, B, C) are used in at least one sector of a multi-sector base station and its associated relay station. In some embodiments, multiple multi-sector cells in the communications system use the same mapping between slot type allocations and sectors, e.g., in accordance with a predetermined pattern. In some embodiments, at least some different cells have different mappings between sectors and slot type allocations, e.g., in accordance with a predetermined pattern.

The techniques of various embodiments may be implemented using software, hardware and/or a combination of software and hardware. Various embodiments are directed to apparatus, e.g., relay stations, mobile nodes such as mobile access terminals, base stations including one or more attachment points, and/or communications systems. Various embodiments are also directed to methods, e.g., method of controlling and/or operating relay stations, mobile nodes, base stations and/or communications systems, e.g., hosts.

Various embodiments are also directed to machine, e.g., computer, readable medium, e.g., ROM, RAM, CDs, hard discs, etc., which include machine readable instructions for controlling a machine to implement one or more steps of a method.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes described herein are implemented using one or more modules to perform the steps corresponding to one or more methods, for example, transmitting to a first relay station from a first sector of said communications device during a first time interval; transmitting to a second relay station from a second sector of said communications device during a second time interval, said first and second time intervals being non-overlapping time intervals, etc. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s). Some embodiments are directed to a device, e.g., communications device, including a processor configured to implement one, multiple or all of the steps of one or more methods of the invention.

Some embodiments are directed to a computer program product comprising a computer-readable medium comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

In some embodiments, the processor or processors, e.g., CPUs, of one or more devices, e.g., communications devices such as relay stations, base stations, or wireless terminals are configured to perform the steps of the methods described as being performed by the communications device. Accordingly, some but not all embodiments are directed to a device, e.g., communications device, with a processor which includes a module corresponding to each of the steps of the various described methods performed by the device in which the processor is included. In some but not all embodiments a device, e.g., communications device, includes a module corresponding to each of the steps of the various described methods performed by the device in which the processor is included. The modules may be implemented using software and/or hardware.

While described in the context of an OFDM system, at least some of the methods and apparatus of various embodiments are applicable to a wide range of communications systems including many non-OFDM and/or non-cellular systems. At least some of the methods and apparatus are applicable to hybrid systems, e.g. a system including OFDM and CDMA signaling techniques.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), and/or various other types of communications techniques which may be used to provide wireless communications links between access nodes and mobile nodes, between access nodes and relay station, and/or between relay stations and mobile nodes. In some embodiments the access nodes are implemented as base stations which establish communications links with mobile nodes and/or relay stations using OFDM and/or CDMA. In various embodiments the mobile nodes are implemented as notebook computers, personal data assistants (PDAs), or other portable devices including receiver/transmitter circuits and logic and/or routines, for implementing the methods.

What is claimed is:

1. A method of operating a sectorized communications device, the method comprising:

transmitting to a first relay station from a first sector of said sectorized communications device during a first time interval, said sectorized communications device including N sectors, each sector of said sectorized communications device being oriented in a different direction, said first sector being oriented in a first direction, said sectorized communications device further including a second sector and a third sector, the third sector being oriented in a different direction from said first sector, said different direction being a direction which is offset from said first direction and which is not directly opposite said first direction;

controlling the sectorized communications device to refrain from transmitting from the second sector of said sectorized communications device during said first time interval, said second sector being oriented in a second direction which is different from said first direction;

transmitting to a second relay station from the second sector of said sectorized communications device during a second time interval, said first and second time intervals being recurring time periods in a recurring sequence of N time periods and being non-overlapping time intervals, said second time interval being a time interval during which said first relay station transmits to access terminals; and controlling said first and third sectors according to a first schedule, the same first schedule being used to control transmissions from both said first and third sector, controlling said first and third sectors according to the first schedule including controlling said first and third sectors to transmit during the same time intervals in accordance with said first schedule and to refrain from transmitting during said second time interval in accordance with said first schedule, said first schedule being used to control transmission from at least two adjacent sectors of said sectorized communications device.

2. The method of claim 1, wherein each of said N sectors is oriented towards a different non-sectorized relay station, N being an odd number.

3. The method of claim 2, further comprising:
simultaneously transmitting to access terminals from said first and second sectors.

4. The method of claim 1, wherein said first time interval is a time interval during which said second relay station transmits to access terminals.

5. A sectorized communications device comprising:
at least one processor configured to:
transmit to a first relay station from a first sector of said sectorized communications device during a first time interval, said sectorized communications device including N sectors, each sector of said sectorized communications device being oriented in a different direction, said first sector being oriented in a first direction, said sectorized communications device further including a second sector and a third sector, the third sector being oriented in a different direction from said first sector, said different direction being a direction which is offset from said first direction and which is not directly opposite said first direction;
control the sectorized communications device to refrain from transmitting from the second sector of said sectorized communications device during said first time interval, said second sector being oriented in a second direction which is different from said first direction;
transmit to a second relay station from the second sector of said sectorized communications device during a second time interval, said first and second time intervals being recurring time periods in a recurring sequence of N time periods and being non-overlapping time intervals, said second time interval being a time interval during which said first relay station transmits to access terminals; and
control said first and third sectors according to a first schedule, the same first schedule being used to control transmissions from both said first and third sector, controlling said first and third sectors according to the first schedule including controlling said first and third sectors to transmit during the same time intervals in accordance with said first schedule and to refrain from transmitting during said second time interval in accordance with said first schedule, said first schedule being used to control transmission from at least two adjacent sectors of said sectorized communications device; and
memory coupled to said at least one processor.

6. The sectorized communications device of claim 5, wherein each of said N sectors is oriented towards a different non-sectorized relay station, N being an odd number.

7. The sectorized communications device of claim 6, wherein said at least one processor is further configured to:
simultaneously transmit to access terminals from said first and second sectors.

8. A sectorized communications device comprising:
means for transmitting to a first relay station from a first sector of said communications device during a first time interval, said sectorized communications device including N sectors, each sector of said sectorized communications device being oriented in a different direction, said first sector being oriented in a first direction, said sectorized communications device further including a second sector and a third sector, the third sector being oriented in a different direction from said first sector, said different direction being a direction which is offset from said first direction and which is not directly opposite said first direction;
means for controlling said sectorized communications device to refrain from transmitting from the second sector of said sectorized communications device during said first time interval, said second sector being oriented in a second direction which is different from said first direction;
means for transmitting to a second relay station from the second sector of said sectorized communications device during a second time interval, said first and second time intervals being recurring time periods in a recurring sequence of N time periods and being non-overlapping time intervals, said second time interval being a time interval during which said first relay station transmits to access terminals; and
means for controlling said first and third sectors according to a first schedule, the same first schedule being used to control transmissions from both said first and third sector, controlling said first and third sectors according to the first schedule including controlling said first and third sectors to transmit during the same time intervals in accordance with said first schedule and to refrain from transmitting during said second time interval in accordance with said first schedule, said first schedule being used to control transmission from at least two adjacent sectors of said sectorized communications device.

9. The sectorized communications device of claim 8, wherein each of said N sectors is oriented towards a different non-sectorized relay station, N being an odd number.

10. The sectorized communications device of claim 9, further comprising:
means for simultaneously transmitting to access terminals from said first and second sectors.

11. A computer program product for use in a sectorized communications device, the computer program product comprising:
a non-transitory computer readable medium comprising:
code for causing at least one computer to transmit to a first relay station from a first sector of said sectorized communications device during a first time interval, said sectorized communications device including N sectors, each sector of said sectorized communications device being oriented in a different direction, said first sector being oriented in a first direction, said sectorized communications device further including a second sector and a third sector, the third sector being oriented in a different direction from said first sector, said different direction being a direction which is offset from said first direction and which is not directly opposite said first direction;
code for causing said at least one computer to control said sectorized communications device to refrain from transmitting from the second sector of said sectorized communications device during said first time interval, said second sector being oriented in a second direction which is different from said first direction;
code for causing said at least one computer to transmit to a second relay station from the second sector of said sectorized communications device during a second time interval, said first and second time intervals being recurring time periods in a recurring sequence of N time periods and being non-overlapping time intervals, said second time interval being a time interval during which said first relay station transmits to access terminals; and code for causing said at least one computer to control said first and third sectors according to a first schedule, the same first schedule being used to control transmissions from both said first and third sector, controlling said first and third sectors according to the first schedule including controlling said first and third sectors to transmit during the same time intervals in accordance with said first schedule and to refrain from transmitting during said second time interval in accordance with said first schedule, said first schedule being used to control transmission from at least two adjacent sectors of said sectorized communications device.

12. A method of operating an access terminal, comprising:
communicating with a first access point according to a first schedule used by said first access point, said first access point being positioned adjacent a first sector of a first base station which includes N sectors oriented in different directions, said first base station using less than N schedules to control transmission from the N sectors of said first base station, said first schedule being one of said N schedules, said first schedule being used to control transmission from at least two adjacent sectors of said first base station, said first schedule including a first recurring periodic sequence of communications time slots including a first base station to access terminal communications time slot, a first relay station to access terminal communications time slot, and a first base station to relay station communications time slot;

performing a handoff to a second access point synchronized with said first access point; and communicating with the second access point according to a second schedule used by said second access point, said second schedule including a second recurring periodic sequence of communications time slots including a second relay station to access terminal communications time slot, a second base station to relay station communications time slot, and a second base station to access terminal communications time slot, the first base station to relay station communications time slot in said first schedule not overlapping said second base station to relay station communications time slot in said second schedule.

13. The method of claim 12, wherein the first base station to access terminal communications time slot, the first relay station to access terminal communications time slot, and the first base station to relay station communications time slot are different non-overlapping time slots, the method further comprising:
determining the second schedule from an identifier corresponding to the second access point and stored schedule information.

14. The method of claim 13, wherein said first and second access points are adjacent relay stations.

15. The method of claim 13, wherein the first and second schedules are the same but are offset in time from one another by two communications time slots.

16. The method of claim 14, wherein said second access point is positioned adjacent a second base station sector which uses said second schedule, said first and second base stations each including an odd number of sectors.

17. An access terminal comprising:
at least one processor configured to:
communicate with a first access point according to a first schedule used by said first access point, said first access point being positioned adjacent a first sector of a first base station which includes N sectors oriented in different directions, said first base station using less than N schedules to control transmission from the N sectors of said first base station, said first schedule being one of said N schedules, said first schedule being used to control transmission from at least two adjacent sectors of said first base station, said first schedule including a first recurring periodic sequence of communications time slots including a first base station to access terminal communications time slot, a first relay station to access terminal communications time slot, and a first base station to relay station communications time slot;

perform a handoff to a second access point synchronized with said first access point; and communicate with the second access point according to a second schedule used by said second access point, said second schedule including a second recurring periodic sequence of communications time slots including a second relay station to access terminal communications time slot, a second base station to relay station communications time slot, and a second base station to access terminal communications time slot, the first base station to relay station communications time slot in said first schedule not overlapping said second base station to relay station communications time slot in said second schedule;

and memory coupled to said at least one processor.

18. The access terminal of claim 17, wherein said at least one processor is further configured to:
determine the second schedule from an identifier corresponding to the second access point and stored schedule information.

19. The access terminal of claim 18, wherein said first and second access points are adjacent relay stations; and
wherein said first and second base stations each include an odd number of sectors.

20. The access terminal of claim 18, wherein the first and second schedules are the same but are offset in time from one another by two communications time slots.

21. An access terminal, comprising:
means for communicating with a first access point according to a first schedule used by said first access point, said first access point being positioned adjacent a first sector of a first base station which includes N sectors oriented in different directions, said first base station using less than N schedules to control transmission from the N sectors of said first base station, said first schedule being one of said N schedules, said first schedule being used to control transmission from at least two adjacent sectors of said first base station, said first schedule including a first recurring periodic sequence of communications time slots including a first base station to access terminal communications time slot, a first relay station to access terminal communications time slot, and a first base station to relay station communications time slot;

means for performing a handoff to a second access point synchronized with said first access point; and means for communicating with the second access point according to a second schedule, said second schedule including a second recurring periodic sequence of communications time slots including a second relay station to access terminal communications time slot, a second base station to relay station communications time slot, and a second base station to access terminal communications time slot, the first base station to relay station communications time slot in said first schedule not overlapping said second base station to relay station communications time slot in said second schedule.

22. The access terminal of claim 21, further comprising:
means for determining the second schedule from an identifier corresponding to the second access point and stored schedule information.

23. The access terminal of claim 22, wherein said first and second access points are adjacent relay stations; and
wherein said first and second base stations each include an odd number of sectors.

24. The access terminal of claim 22, wherein the first and second schedules are the same but are offset in time from one another by two communications time slots.

25. The access terminal of claim 23, wherein said second access point is positioned adjacent a second base station sector which uses said second schedule.

26. A computer program product for use in an access terminal, the computer program product comprising:
a non-transitory computer readable medium comprising:
code for causing at least one computer to communicate with a first access point according to a first schedule used by the first access point, said first access point being positioned adjacent a first sector of a first base station which includes N sectors oriented in different directions, said first base station using less than N schedules to control transmission from the N sectors of said first base station, said first schedule being one of said N schedules, said first schedule being used to control transmission from at least two adjacent sectors of said first base station, said first schedule including a first recurring periodic sequence of communications time slots including a first base station to access terminal communications time slot, a first relay station to access terminal communications time slot, and a first base station to relay station communications time slot;
code for causing said at least one computer to perform a handoff to a second access point synchronized with said first access point; and
code for causing said at least one computer to communicate with the second access point according to a second schedule used by said second access point, said second schedule including a second recurring periodic sequence of communications time slots including a second relay station to access terminal communications time slot, a second base station to relay station communications time slot, and a second base station to access terminal communications time slot, the first base station to relay station communications time slot in said first schedule not overlapping said second base station to relay station communications time slot in said second schedule.

27. The method of claim 1, further comprising:
transmitting to a third relay station from the third sector of said sectorized communications device during first time interval.

28. The method of claim 27, wherein said first and second relay stations are relay stations corresponding to said first and second sectors, respectively.

29. The method of claim 1, wherein said sectorized communications device includes an odd number of sectors.

30. The method of claim 1 wherein said first relay station is a non-sectorized device.

31. The method of claim 12, wherein said first and second access points are non-sectorized devices.

32. The method of claim 12,
wherein said first base station to access terminal communications time slot occurs at the same time as said second relay station to access terminal communication time slot;
wherein said first relay station to access terminal communications time slot occurs at the same time as said second base station to relay station communications time slot; and
wherein said first base station to relay station communications time slot occurs at the same time as said second base station to access terminal slot.

33. The method of claim 32, wherein said first and second base stations include an odd number of sectors, each sector of the first and second base stations facing in a different direction.

34. The method of claim 1, wherein the first and second relay stations are non-sectorized relay stations.

35. The method of claim 1, further comprising:
controlling transmission from the second sector according to a second transmission schedule.

36. The method of claim 35,
wherein the number of schedules used to control transmission from sectors of said communications device is one fewer than the number of sectors in said communications device.

37. The method of claim 1, further comprising:
controlling said sectorized communications device to refrain from transmitting from each of the N sectors for a duration of one time slot during a period of time having a duration of N time slots, said first and second time intervals being time slots during said period of time having a duration of N time slots, at least some of said sectors being controlled to refrain from transmitting during different time slots which occur during said period of time having duration of N time slots.

* * * * *